(12) United States Patent
Lu et al.

(10) Patent No.: US 11,809,069 B2
(45) Date of Patent: Nov. 7, 2023

(54) COAXIAL LASER LIGHT SOURCE APPARATUS

(71) Applicant: DELTA ELECTRONICS, INC., Taoyuan (TW)

(72) Inventors: Chun-Hsien Lu, Taoyuan (TW); Yu-Nien Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 38 days.

(21) Appl. No.: 17/454,050

(22) Filed: Nov. 8, 2021

(65) Prior Publication Data
US 2022/0382139 A1  Dec. 1, 2022

(30) Foreign Application Priority Data

May 25, 2021  (CN) .......................... 202110571325.5

(51) Int. Cl.
*G03B 21/20* (2006.01)
*G02B 27/09* (2006.01)
*H04N 9/31* (2006.01)

(52) U.S. Cl.
CPC ..... *G03B 21/2033* (2013.01); *G02B 27/0927* (2013.01); *H04N 9/3161* (2013.01)

(58) Field of Classification Search
CPC ............ G03B 21/2033; G02B 27/0927; H04N 9/3161
USPC .......................................................... 353/30
See application file for complete search history.

(56) References Cited

U.S. PATENT DOCUMENTS 8,350,789 B2    1/2013  Furuya et al.

FOREIGN PATENT DOCUMENTS

| CN | 111308619 A | 6/2020 |
|---|---|---|
| CN | 111381425 A | 7/2020 |
| CN | 211427028 U | 9/2020 |
| TW | I639035 B | 10/2018 |
| WO | WO-2022174840 A1 * | 8/2022 |

OTHER PUBLICATIONS

Translation of Application WO 2022174840 (Year: 2023).*

* cited by examiner

*Primary Examiner* — Jerry L Brooks
(74) *Attorney, Agent, or Firm* — CKC & Partners Co., LLC

(57) ABSTRACT

A coaxial laser light source apparatus includes at least one laser light source module, a beam homogenizer, and optical path adjusting elements. The laser light source module includes multiple laser light sources arranged along a first direction, and each of the laser light sources is configured to emit a laser light along a second direction. The first direction is substantially perpendicular to the second direction, and the laser lights have different properties. The laser lights travel along the second direction toward the beam homogenizer coaxially. The optical path adjusting elements are located between the laser light sources and the beam homogenizer, and the optical path adjusting elements are configured to adjust traveling directions of the laser lights.

18 Claims, 6 Drawing Sheets

COAXIAL LASER LIGHT SOURCE APPARATUS

CROSS-REFERENCE TO RELATED APPLICATION

This application claims priority to China Application Serial Number 202110571325.5, filed May 25, 2021, which is herein incorporated by reference in its entirety.

BACKGROUND

Field of Invention

The present invention relates to a coaxial laser light source apparatus.

Description of Related Art

Independent optical systems are employed in the laser light projection device currently to perform optical coupling such that laser lights with different colors may be combined along single optical axis. However, the volume of such system is greater, and therefore it is unfavorable to apply such system in a projection system.

If multiple laser light sources are integrated in a single module of the projecting system, optical axis of the color lights are not coaxial. As a result, the projecting system may have non-uniform intensity and non-uniform color, and therefore color blocks may appear on the display screen.

Accordingly, it is still a development direction for the industry to provide a coaxial laser light source apparatus such that laser light sources of a single laser light source module can be coaxial.

SUMMARY

One aspect of the present disclosure is a coaxial laser light source apparatus.

In some embodiments, the coaxial laser light source apparatus includes at least one laser light source module, a beam homogenizer, and optical path adjusting elements. The laser light source module includes multiple laser light sources arranged along a first direction, and each of the laser light sources is configured to emit a laser light along a second direction. The first direction is substantially perpendicular to the second direction, and the laser lights have different properties. The laser lights travel along the second direction toward the beam homogenizer coaxially. The optical path adjusting elements are located between the laser light sources and the beam homogenizer, and the optical path adjusting elements are configured to adjust traveling directions of the laser lights.

In some embodiments, the properties of the laser lights include wavelength, polarization state, or a combination thereof.

In some embodiments, the optical path adjusting elements include a combination of a reflective lens, a refractor, a beam splitter, or a prism.

In some embodiments, the laser lights overlap with an inlet of the beam homogenizer.

In some embodiments, the laser light source module includes multiple laser light sources having the same wavelengths, and the laser light sources are configured to emit the laser lights having the same wavelengths.

In some embodiments, the laser lights having the same wavelengths are distributed symmetrically at an inlet of the beam homogenizer.

In some embodiments, the coaxial laser light source apparatus further includes a light combiner, and the light combiner is located between the laser light sources having the same wavelengths and the beam homogenizer.

In some embodiments, the light combiner is located between the laser light sources having the same wavelengths and the optical path adjusting elements.

In some embodiments, the light combiner is located between the optical path adjusting elements.

In some embodiments, the light combiner is located between the optical path adjusting elements and the beam homogenizer.

In some embodiments, a number of the laser light module is plural, and an arrangement direction of the laser light sources of each of the laser light modules is substantially perpendicular to a traveling direction of the laser lights.

In some embodiments, the coaxial laser light source apparatus further includes multiple polarizing elements located between the optical path adjusting elements.

In some embodiments, each of the polarizing elements includes a polarization splitter and at least one polarization waveplate.

In some embodiments, the at least one polarization waveplate is configured to rotate a polarization angle of the laser light by 180 degrees.

In some embodiments, the laser lights facing the beam homogenizer have the same polarities.

Another aspect of the present disclosure is a coaxial laser light source apparatus.

In some embodiments, the coaxial laser light source apparatus includes at least one laser light source module, a beam homogenizer, an optical path adjusting assembly, and an axis distance adjusting assembly. The laser light source module includes multiple laser light sources arranged along a first direction, and each of the laser light source is configured to emit a laser light along a second direction. The first direction is substantially perpendicular to the second direction, and the laser lights have different properties. The laser lights travel along the second direction toward the beam homogenizer coaxially. The optical path adjusting assembly includes a plurality of optical path adjusting elements arranged along the second direction, and the optical path adjusting assembly is configured to separate the laser lights from the laser light sources. The axis distance adjusting assembly includes multiple optical path adjusting elements, and the axis distance adjusting assembly is configured to adjust positions along the first direction of the laser lights traveling toward the beam homogenizer.

In some embodiments, the optical path adjusting elements of the optical path adjusting assembly are arranged along the second direction.

In some embodiments, the axis distance adjusting assembly corresponds to the optical path adjusting assembly, and the optical path adjusting elements of the axis distance adjusting assembly are respectively located between the optical path adjusting elements of the optical path adjusting assembly and the beam homogenizer.

In some embodiments, the optical path adjusting elements includes a combination of a reflective lens, a refractor, a beam splitter, or a prism.

In some embodiments, the laser lights are overlapped with each other at an inlet of the beam homogenizer.

In the aforementioned embodiments, multiple laser light sources can be integrated in a laser light source module through the coaxial laser light source apparatus, and the coaxial laser light source apparatus can be applied in a projecting system so as to reduce volume. Multiple laser lights can enter the beam homogenizer coaxially and symmetrically. In addition, the laser lights with different polarization states can be adjusted as laser lights with the same polarization state entering the beam homogenizer coaxially through the coaxial laser light source apparatus. As such, the possibility of the occurrence of the laser facula with non-uniform intensity and color in the projector can be reduced so as to avoid color blocks on the display screen.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
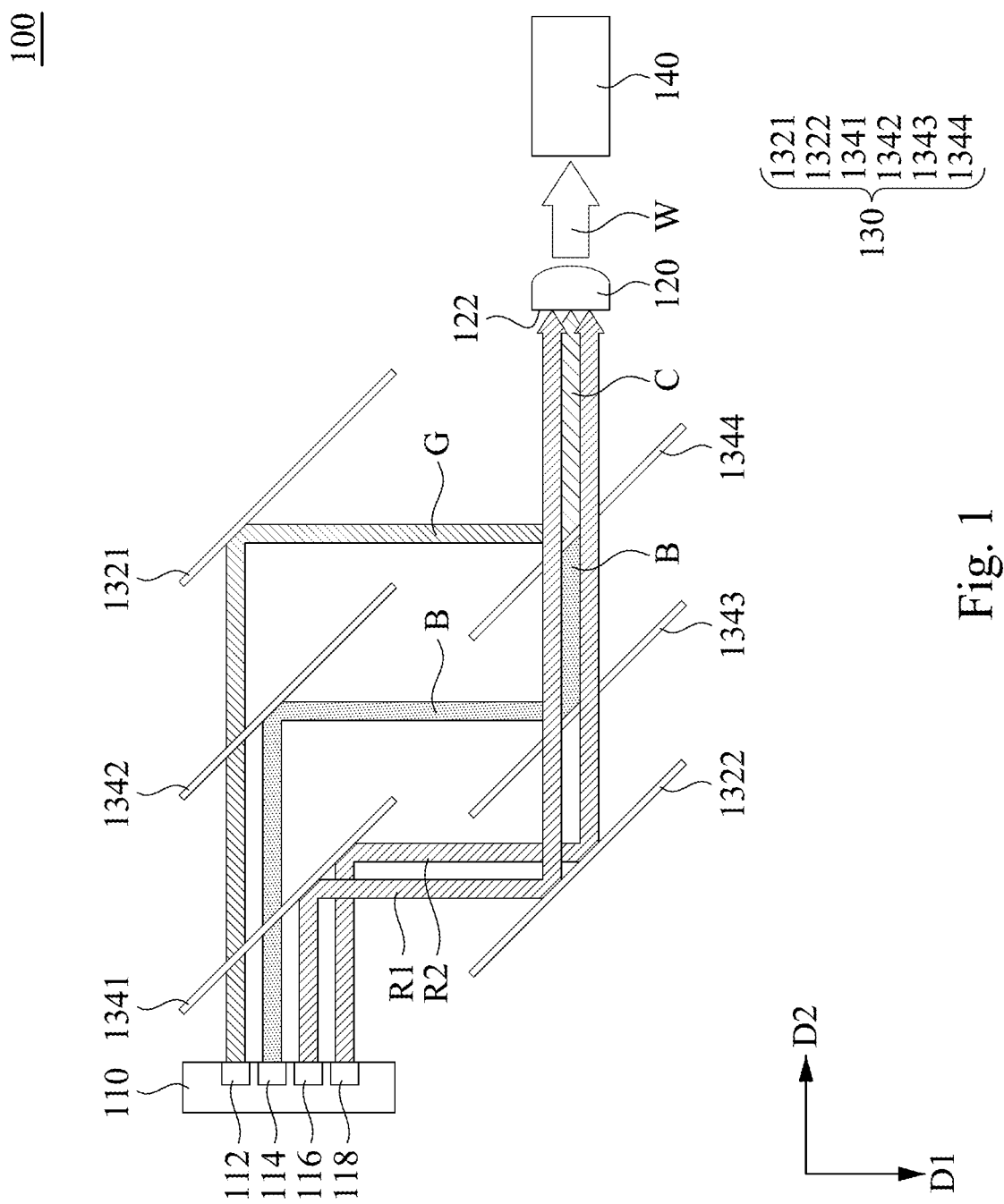
FIG. 1 is a schematic of a coaxial laser light source apparatus according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic of a coaxial laser light source apparatus 100 according to one embodiment of the present disclosure. The laser light source apparatus 100 includes a laser light source module 110, a beam homogenizer 120, and optical path adjusting elements 130. The laser light source module 110 includes multiple laser light sources arranged along a first direction D1. For example, in the present embodiment, the laser light source module 110 includes a green laser light source 112, a blue light source 114, and red light sources 116, 118, and the present embodiment is not limited by these regards. Each of the laser light sources is configured to emit a laser light along a second direction D2.

For example, in the present embodiment, the green laser light source 112 is configured to emit a green light G along the second direction D2, the blue light source 114 is configured to emit a blue light B along the second direction D2, and the red light sources 116, 118 are configured to emit red lights R1, R2 along the second direction D2. The aforementioned laser lights (the green light G, the blue light B, and the red lights R1, R2) have different properties. For example, the aforementioned laser lights have different wavelengths, polarities, or a combination thereof. In the present embodiment, the first direction D1 is substantially perpendicular to the second direction D2. The optical path adjusting elements 130 are located between the laser light source module 110 and the beam homogenizer 120. The optical path adjusting elements 130 are configured to adjust traveling directions of the laser lights such that the laser lights (the green light G, the blue light B, and the red lights R1, R2) travel along the second direction D2 toward the beam homogenizer 120 coaxially.

In the present embodiment, the optical path adjusting elements 130 include reflective lenses and beam splitters. For example, as shown in FIG. 1, two beam splitters 1341, 1342 and a reflective lens 1321 are positioned sequentially in front of the laser light source module 110 and are arranged along the second direction D2. The green light G is reflected by the reflective lens 1321 and travel along the first direction D1 after passing the two beam splitters 1341, 1342. The blue light B2 is reflected by another reflective lens 1342 and travel along the first direction D1 after passing the beam splitter 1341. The red lights R1, R2 are reflected by the beam splitter 1341. In other words, the blue light B and the green light G can pass through the beam splitter 1341 that is close to the laser light source module 110, and the green light G can pass through the reflective lens 1342 in the middle.

The reflected red lights R1, R2 are reflected again by another reflective lens 1322 and travel along the second direction D2 toward the beam homogenizer 120. The blue light B is reflected again by another beam splitter 1343 and travel along the second direction D2 toward the beam homogenizer 120, and the red lights R1, R2 can pass through this beam splitter 1343. The reflected green light G is reflected again by another beam splitter 1344 and travel along the second direction D2 toward the beam homogenizer 120, and the red lights R1, R2 and the blue light B all can pass through this beam splitter 1344. The blue light B and the green light G that have passed through the beam splitter 1344 coaxially combine and form a cyan light C, and the cyan light C is align with the beam homogenizer 120. That is, besides coaxially aligned along the second direction D2, the blue light B and the green light G are overlapped with each other. The reflected red lights R1, R2 distribute relative to the cyan light C symmetrically. In other words, the reflected red lights R1, R2 are symmetrical to the optical axis direction (that is the second direction D2) of the cyan light C. The red lights R1, R2 and the cyan light C passed through the beam homogenizer 120 form a uniform white light W and travel along the light source system 140. The light source system 140 is connected to a projector module of a projecting system so as to project an image onto the display screen.

Briefly speaking, the optical path adjusting elements 130 can be categorized as two groups. One group is optical path adjusting assembly (beam splitter 1341, beam splitter 1342, and reflective lens 1321), and another group is axis distance adjusting group (reflective lens 1322, beam splitter 1343, and beam splitter 1344). The optical path adjusting assembly is used to separate the color lights of the laser light source module 110 from the optical path. The axis distance adjusting assembly corresponds to each of the color lights and is used to adjust positions of the color lights emitting to the beam homogenizer 120 (that is, the arrangement positions along the first direction D1) such that all the color lights can be coaxially aligned. Under such principle, the optical path adjusting elements 130 can includes a combination of a refractor, a prism, or a combination of those mentioned above as long as different color lights of the laser light source module 110 can be separated and coaxially and symmetrically travel toward the beam homogenizer 120. Accordingly, the blue light B and the green light G can overlap with each other at an inlet 122 of the beam homogenizer 120 through the optical path adjusting elements 130, and the red lights R1, R2 can distribute symmetrically relative to the blue light B and the green light G at the inlet 122 of the beam homogenizer 120.

In the present embodiment, two red laser light sources 116, 118 can increase red light intensity of the laser light source module 110. The red lights R1, R2 emitted from the red laser light sources 116, 118 have substantially the same wavelengths, and therefore the red lights R1, R2 are reflected by the same beam splitter 1341. In other embodiments, the red laser light sources 116, 118 have different wavelengths, and can be reflected by different beam splitters. In other words, a number and a configuration of the optical path adjusting elements 130 can be adjusted based on practical requirements.

The laser light source module 110 of the present disclosure can integrate multiple laser light sources, and therefore it can reduce volume. However, those laser light sources in a single laser light source module 110 cannot be aligned coaxially. Laser facula with non-uniform intensity and color may occur after the laser lights that are not coaxially aligned are emitted from the projecting system of a projector. Therefore, the laser light source module 110 having multiple laser light sources of the present disclosure can be applied in a projecting system such that multiple laser lights can enter the beam homogenizer 120 coaxially and symmetrically. As such, the possibility of the laser facula with non-uniform intensity and color can be reduced so as to avoid color blocks on the display screen.

Figure 2:
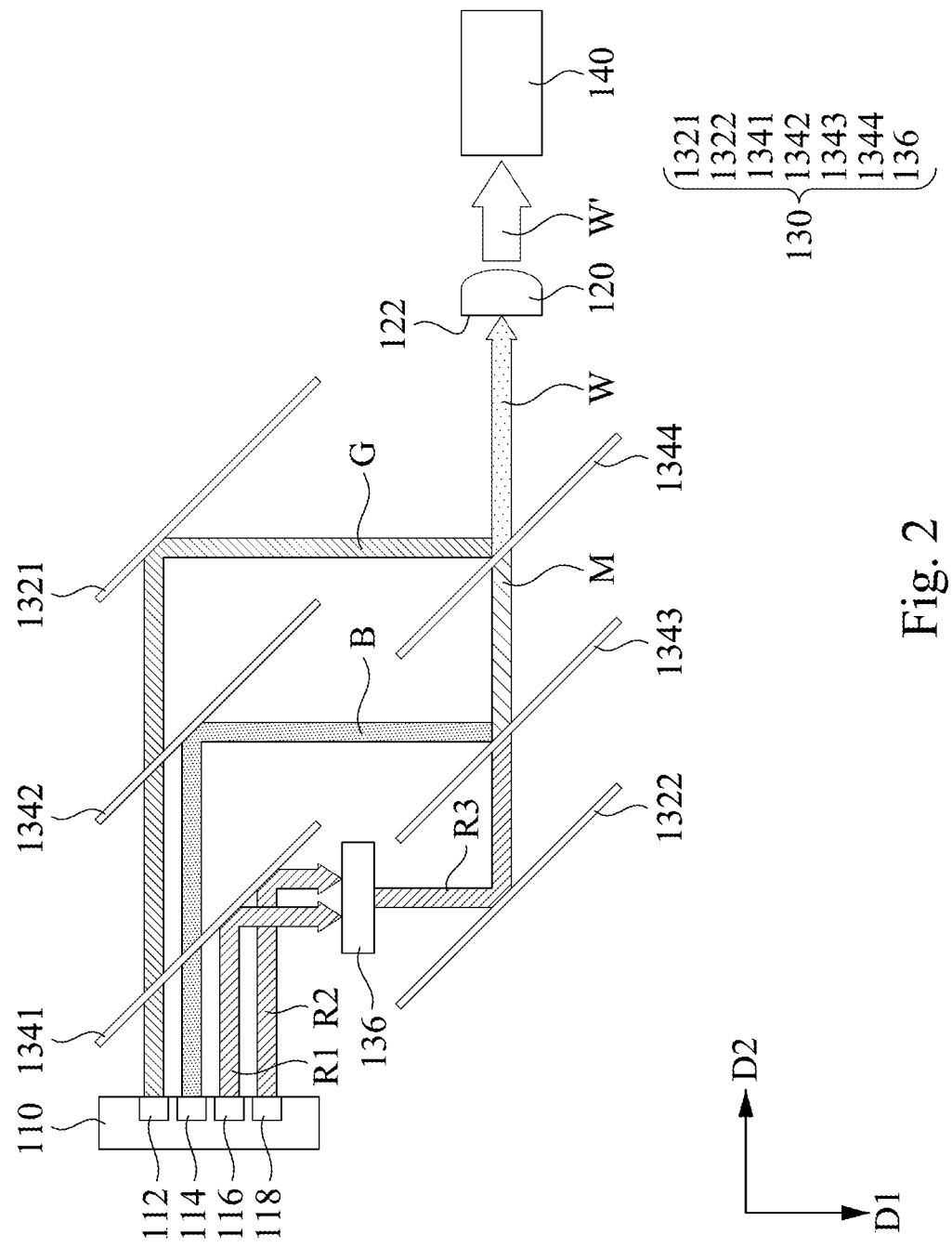
FIG. 2 is a schematic of a coaxial laser light source apparatus according to another embodiment of the present disclosure.

FIG. 2 is a schematic of a coaxial laser light source apparatus 100a according to another embodiment of the present disclosure. The coaxial laser light source apparatus 100a is substantially the same as the coaxial laser light source apparatus 100, and the difference is that the coaxial laser light source apparatus 100a further includes a light combiner 136 such as a prism, a lens, a concave mirror, a reflective lens, or a combination thereof such that light with similar or same property (e.g., wavelength or polarization state) converge. In the present embodiment, the light combiner 136 is located between the beam splitter 1341 and the reflective lens 1322, and the red lights R1, R2 converge to form a red light R3 before being reflected by the reflective lens 1322. Since a number of the red laser lights sources 116, 118 is greater than a number of the laser light source of other color, and therefore the size of the facula of red light R3 is greater. TH size of the facula of red light R3 can be adjusted through the light combiner 136 that couple the red lights R1, R2 so as to reduce deviation between sizes of facula of different color lights. The red light R3 is combined with the blue light B to form a magenta light M after the red light R3 passing through the beam splitter 1343, and the magenta light M is combined with the green light G to form a white light W after passing through the beam splitter 1344. The white light W form a uniform white light W after entering the beam homogenizer 120 and then enters the light source system 140. The coaxial laser light source apparatus 100a has the same advantages as those of the coaxial laser light source apparatus 100, and the description is not repeated hereinafter.

Figure 3:
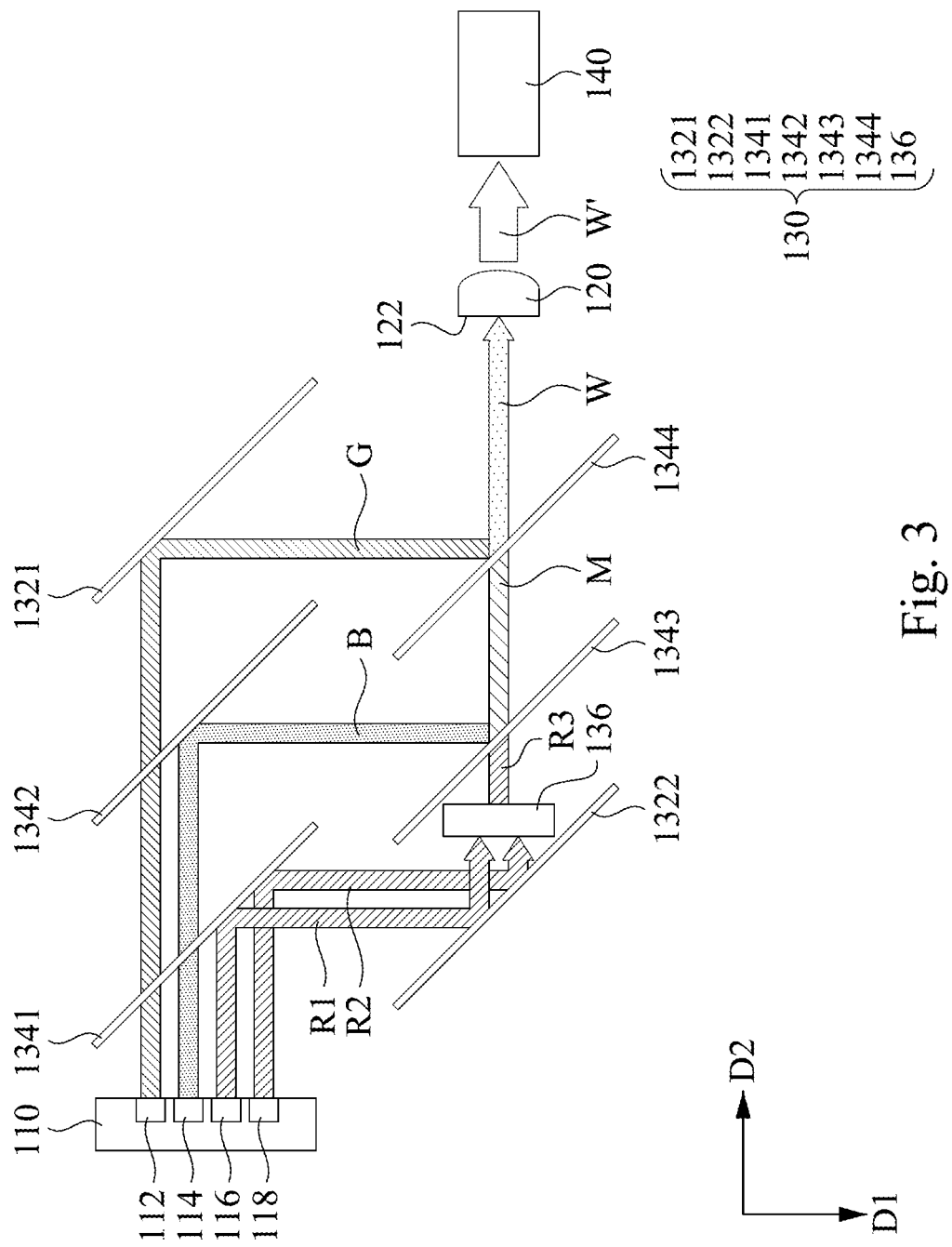
FIG. 3 is a schematic of a coaxial laser light source apparatus according to another embodiment of the present disclosure.

FIG. 3 is a schematic of a coaxial laser light source apparatus 100b according to another embodiment of the present disclosure. The coaxial laser light source apparatus 100b is substantially the same as the coaxial laser light source apparatus 100a, and the difference is that the light combiner 136 of the coaxial laser light source apparatus 100b is located between the reflective lens 1322 and the beam splitter 1343 such that the red lights R1, R2 converge to form a red light R3 after being reflected by the reflective lens 1322. The coaxial laser light source apparatus 100b has the same advantages as those of the coaxial laser light source apparatus 100a, and the description is not repeated hereinafter.

Figure 4:
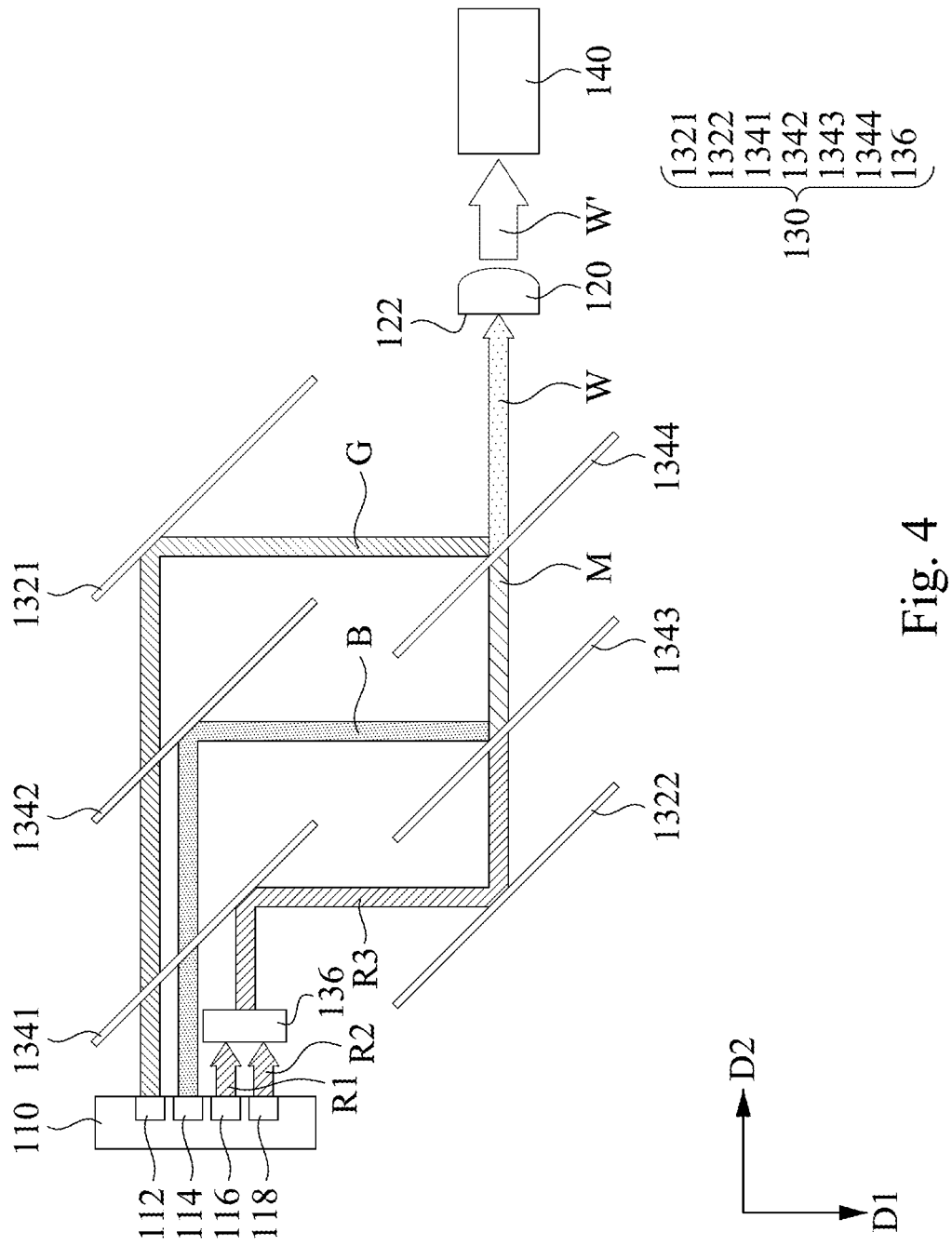
FIG. 4 is a schematic of a coaxial laser light source apparatus according to another embodiment of the present disclosure.

FIG. 4 is a schematic of a coaxial laser light source apparatus 100c according to another embodiment of the present disclosure. The coaxial laser light source apparatus 100c is substantially the same as the coaxial laser light source apparatus 100a, and the difference is that the light combiner 136 of the coaxial laser light source apparatus 100c is located between the red laser light sources 116, 118 having the same wavelength and the beam splitter 1341 such that the red lights R1, R2 emitted from the red laser light sources 116, 118 converge to form a red light R3 before being reflected by the beam splitter 1341. The coaxial laser light source apparatus 100c has the same advantages as those of the coaxial laser light source apparatus 100a, and the description is not repeated hereinafter.

Figure 5:
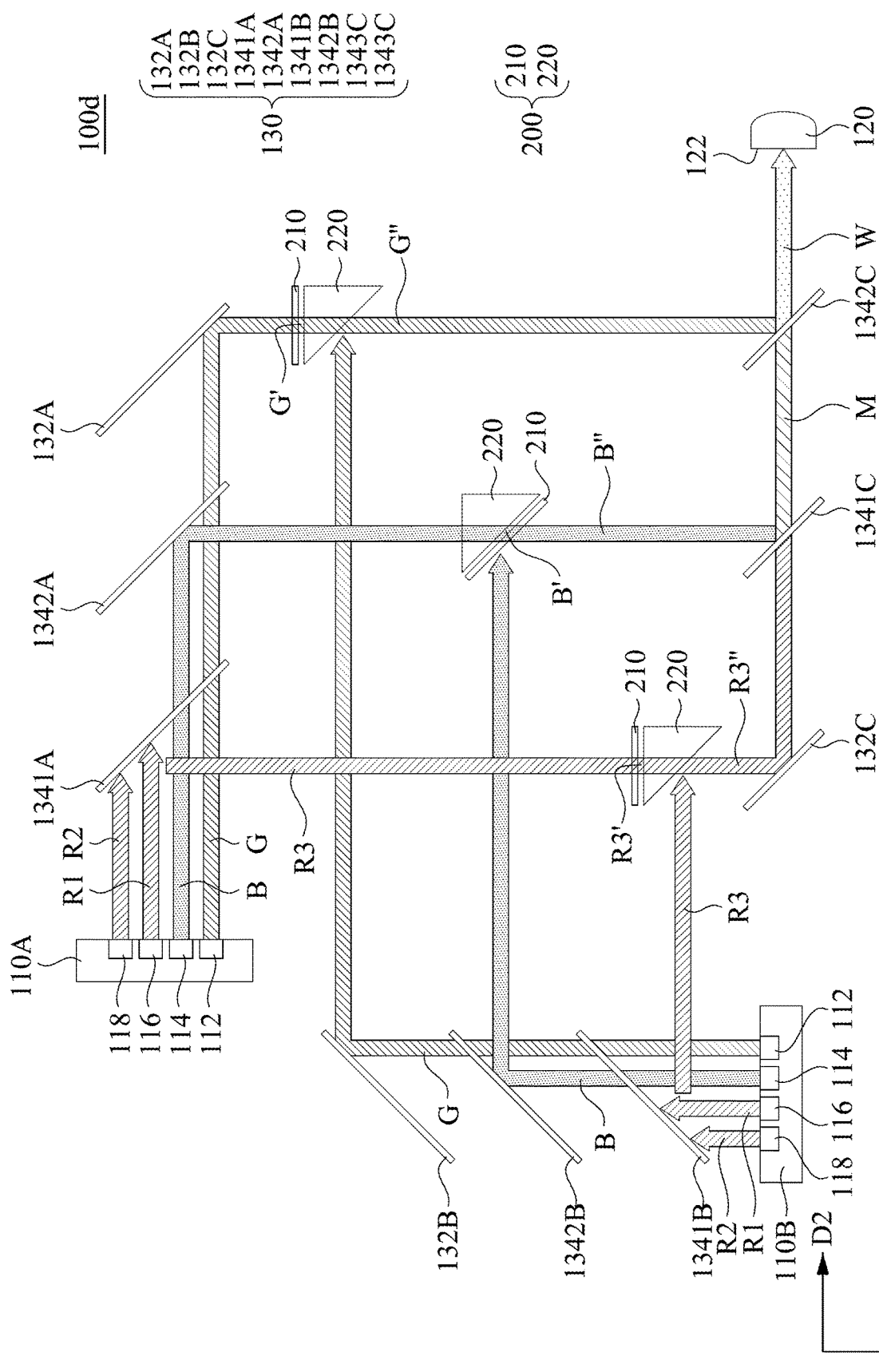
FIG. 5 is a schematic of a coaxial laser light source apparatus according to another embodiment of the present disclosure.

FIG. 5 is a schematic of a coaxial laser light source apparatus 100d according to another embodiment of the present disclosure. The coaxial laser light source apparatus 100d includes two laser light source modules 110A, 110B. Each of the laser light source modules 110A, 110B has a green laser light source 112, a blue light source 114, and red light sources 116, 118. The green light G, the blue light B, and the red lights R1, R2 emitted from the laser light source module 110A travel toward the first direction D1 after being separated by the beam splitters 1341B, 1342B and being reflected by the reflective lens 132B. The green light G, the blue light B, and the red lights R1, R2 emitted from the laser light source modules 110B travel toward the second direction D2 after being separated by the beam splitters 1341B, 1342B and being reflected by the reflective lens 132B. The red lights R1, R2 from the laser light source modules 110A, 110B can form a red light R3 through the aforementioned light combiner (not shown).

In the present embodiment, the coaxial laser light source apparatus 100d further includes polarizing elements 200 located between the optical path adjusting elements 130. The polarizing elements 200 include polarization waveplates 210 and polarization splitters 220. In the present embodiment, the polarization waveplates 210 are ½ waveplates configured to rotate the polarization angle of the laser light by 180 degrees, but the present disclosure is not limited in this regard. In other embodiments, the polarization waveplates 210 can also be a combination of two ¼ waveplates that configured to rotate the polarization angle of the laser light by 90 degrees, respectively.

In the present embodiment, the color lights emitted from the laser light source modules 110A, 110B have different polarization states. For example, the green light G emitted from the laser light source modules 110A, 110B is an S-wave, and the blue light B is a P-wave. The green light G emitted from the laser light source modules 110A become a green light G' after the polarization angle is rotated through the polarization waveplates 210, and the green light G' is a P-polarized light. The polarization splitter 220 is configured in a manner such that the P-polarized light can transmit through the polarization splitter 220 and the S-polarized light is reflected. Therefore, the green light G' from the laser light source module 110A may transmit through the polarization splitter 220 and travel towards the beam splitter 1342C, and the green light G from the laser light source module 110B may is reflected by the polarization splitter 220 and travel towards the beam splitter 1342C. P-polarized green light G' and the S-polarized green light G may combine to form a green light G" with both P and S polarization states.

On the contrary, the polarization state of the blue light B emitted from the laser light source module 110B become a S-polarized blue light B' after passing through the polarization waveplate 210. Therefore, the blue light B' from the laser light source module 110B is reflected by the polarization splitter 220 and travel towards the beam splitter 1341C, and the blue light B from the laser light source module 110A may transmit through the polarization splitter 220 and travel towards the beam splitter 1341C. P-polarized blue light B and the S-polarized blue light B' may combine to form a blue light B" with both P and S polarization states. In other words, the blue light B and the green light G with different polarization states are adjusted to a coaxial white light W with the same polarization state (both P and S polarization states) after passing the polarization element 200. The white light W with the same polarization states will form the uniform white light W after passing the beam homogenizer 120 and then travel to the light source system 140.

In the present embodiment, the optical path adjusting elements 130 can be substantially categorized as two groups. One group is optical path adjusting assembly (beam splitter 1341A, beam splitter 1341B, beam splitter 1342A, beam splitter 1342B, reflective lens 132A, and reflective lens 132B) configured to separate the color lights of the laser light source modules 110A, 101B. Another group is axis distance adjusting group (beam splitter 1341C, beam splitter 1342C, and reflective lens 132C) configured to adjust positions of the color lights along the first direction D1. In addition, if the red light R3 emitted from the laser light source modules 110A, 110B is an S-polarized light, a polarization element 20 corresponding to the green light G can be utilized. If the red light R3 emitted from the laser light source modules 110A, 110B is an P-polarized light, a polarization element 20 corresponding to the blue light B can be utilized. In the embodiment shown in FIG. 5, the S-polarized red light R3 is merely an example, and the present disclosure is not limited in this regard.

Figure 6A:
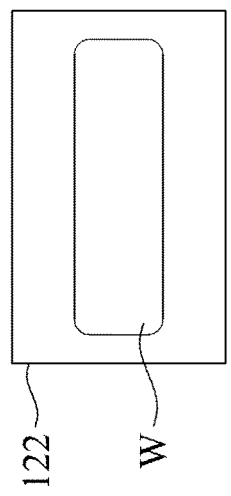
FIG. 6A to FIG. 6C are schematics of inlets of the beam homogenizers of different embodiments of the present disclosure.
Figure 6B:
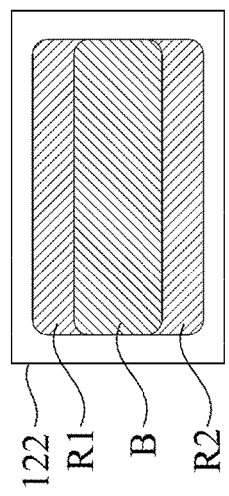
Figure 6C:
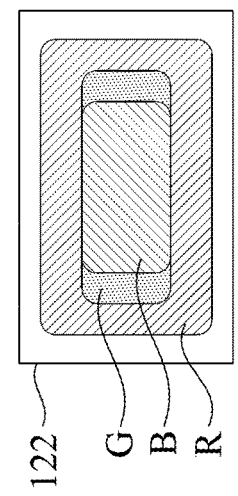

FIG. 6A to FIG. 6C are schematics of inlets 122 of the beam homogenizers 120 of different embodiments of the present disclosure. It is noted that a clear and uniform profile of the facula are illustrated for the sake of convenience. However, the actual facula has highest center intensity and an intensity distribution of which the intensity decays outwardly. As shown in FIG. 6A, multiple laser lights entering the inlets 122 of the beam homogenizers 120 are overlapped with each other coaxially and form a white light W. As shown in FIG. 6B, distribution of the red lights R1, R2 is symmetrical relative to the blue light B (or the cyan light C after the blue light B is combined with the green light G). Or, the facula of the combined red light has a greater area, and the faculae of the blue light B (or the cyan light C after the blue light B is combined with the green light G) and the red light R are coaxial. Therefore, the facula of the blue light B entering the inlet 122 (or the cyan light C after the blue light B is combined with the green light G) will be surrounds by the facula of the red light. As shown in FIG. 6C, faculae of the red light R, the blue light B, and the green light G have different areas. For example, the facula of the blue light B has smallest area, and the facula of the red light R has maximum area. By using the coaxial laser light source apparatus 100, the faculae of the red light R, the blue light B, and the green light G are coaxial. Accordingly, multiple laser lights can enter the inlet 122 of the beam homogenizers 120 coaxially and symmetrically through the coaxial laser light source apparatus of the present disclosure so as to reduce the possibility of the laser facula with non-uniform intensity and color and to avoid color blocks on the display screen.

Figure 7A:
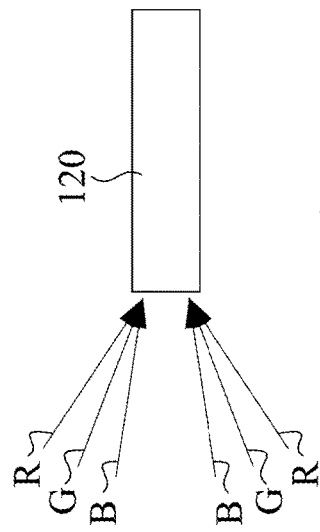
FIG. 7A to FIG. 7C are schematics of entering angles of the beam homogenizers of different embodiments of the present disclosure.
Figure 7B:
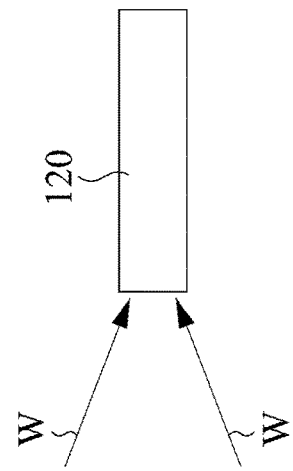
Figure 7C:
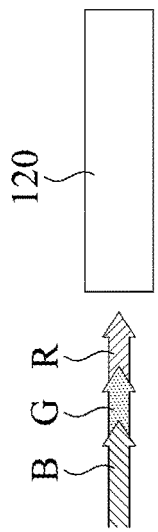

FIG. 7A to FIG. 7C are schematics of entering angles of the beam homogenizers 120 of different embodiments of the present disclosure. Since different color lights from the laser light source module have different output angles, elements can be set in the optical path so as to adjust the incident light angle of the laser light entering the beam homogenizer 120. The configuration that the red light R, the blue light B, and the green light G are all coaxial is illustrated in FIG. 7A. The configuration that the red light R, the blue light B, and the green light G have different angle and are coaxial is illustrated in FIG. 7B. The configuration that the red light R, the blue light B, and the green light G are combined coaxially to form a white light W is illustrated in FIG. 7C. For example, an element for adjusting incident light angle can be integrated with the light combiner or be disposed between the optical path adjusting elements.

In summary, multiple laser light sources can be integrated in a laser light source module through the coaxial laser light source apparatus, and the coaxial laser light source apparatus can be applied in a projecting system so as to reduce volume. Multiple laser lights can enter the beam homogenizer coaxially and symmetrically. In addition, the laser lights with different polarization states can be adjusted as laser lights with the same polarization state entering the beam homogenizer coaxially through the coaxial laser light source apparatus. As such, the possibility of the occurrence of the laser facula with non-uniform intensity and color in the projector can be reduced so as to avoid color blocks on the display screen.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A coaxial laser light source apparatus, comprising:
   at least one laser light source module comprising a plurality of laser light sources arranged along a first direction, and each of the laser light sources is configured to emit a laser light along a second direction, wherein the first direction is substantially perpendicular to the second direction, and the laser lights comprises a first laser light, a second laser light, and a third laser light, and the laser lights have different properties;
   a beam homogenizer, wherein the laser lights travel along the second direction toward the beam homogenizer coaxially; and
   a plurality of optical path adjusting elements located between the laser light sources and the beam homogenizer, wherein the optical path adjusting elements are configured to adjust traveling directions of the laser lights, the plurality of optical path adjusting elements comprises:

a first beam splitter and a first reflective lens configured to adjust the first laser light;

a second beam splitter and a third beam splitter configured to adjust the second laser light; and a second reflective lens and a fourth beam splitter configured to adjust the third laser light.

2. The coaxial laser light source apparatus of claim 1, wherein the properties of the laser lights comprise wavelength, polarization state, or a combination thereof.

3. The coaxial laser light source apparatus of claim 1, wherein the laser lights overlap with an inlet of the beam homogenizer.

4. The coaxial laser light source apparatus of claim 1, wherein the laser light source module comprises a plurality of laser light sources having the same wavelengths, and the laser light sources are configured to emit the laser lights having the same wavelengths.

5. The coaxial laser light source apparatus of claim 4, wherein the laser lights having the same wavelengths are distributed symmetrically at an inlet of the beam homogenizer.

6. The coaxial laser light source apparatus of claim 4, further comprising a light combiner, wherein the light combiner is located between the laser light sources having the same wavelengths and the beam homogenizer.

7. The coaxial laser light source apparatus of claim 6, wherein the light combiner is located between the laser light sources having the same wavelengths and the optical path adjusting elements.

8. The coaxial laser light source apparatus of claim 6, wherein the light combiner is located between the optical path adjusting elements.

9. The coaxial laser light source apparatus of claim 6, wherein the light combiner is located between the optical path adjusting elements and the beam homogenizer.

10. The coaxial laser light source apparatus of claim 1, wherein a number of the laser light source module is plural, and an arrangement direction of the laser light sources of each of the laser light source modules is substantially perpendicular to a traveling direction of the laser lights.

11. The coaxial laser light source apparatus of claim 10, further comprising:

a plurality of polarizing elements located between the optical path adjusting elements.

12. The coaxial laser light source apparatus of claim 11, wherein each of the polarizing elements comprises a polarization splitter and at least one polarization waveplate.

13. The coaxial laser light source apparatus of claim 12, wherein the at least one polarization waveplate is configured to rotate a polarization angle of the laser light by 180 degrees.

14. The coaxial laser light source apparatus of claim 10, wherein the laser lights facing the beam homogenizer have the same polarities.

15. A coaxial laser light source apparatus, comprising:

at least one laser light source module comprising a plurality of laser light sources arranged along a first direction, and each of the laser light sources is configured to emit a laser light along a second direction, wherein the first direction is substantially perpendicular to the second direction, and the laser lights comprises a first laser light, a second laser light, and a third laser light, and the laser lights have different properties;

a beam homogenizer, wherein the laser lights travel along the second direction toward the beam homogenizer coaxially;

an optical path adjusting assembly comprising a plurality of optical path adjusting elements, wherein the optical path adjusting elements of the optical path adjusting assembly comprises a first beam splitter, a second beam splitter, and a second reflective lens arranged along the second direction configured to separate the first laser light, the second laser light, and the third laser light, respectively; and an axis distance adjusting assembly comprising a plurality of optical path adjusting elements, wherein the optical path adjusting elements of the axis distance adjusting assembly comprises a first reflective lens, a third beam splitter, and a fourth beam splitter configured to adjust positions along the first direction of the first laser light, the second laser light, and the third laser light traveling toward the beam homogenizer, respectively.

16. The coaxial laser light source apparatus of claim 15, wherein the optical path adjusting elements of the optical path adjusting assembly are arranged along the second direction.

17. The coaxial laser light source apparatus of claim 15, wherein the axis distance adjusting assembly corresponds to the optical path adjusting assembly, and the optical path adjusting elements of the axis distance adjusting assembly are respectively located between the optical path adjusting elements of the optical path adjusting assembly and the beam homogenizer.

18. The coaxial laser light source apparatus of claim 15, wherein the laser lights are overlapped with each other at an inlet of the beam homogenizer.

* * * * *